United States Patent [19]

Yamada et al.

[11] Patent Number: 4,618,868

[45] Date of Patent: Oct. 21, 1986

[54] INK JET RECORDING APPARATUS

[75] Inventors: Takahiro Yamada, Ibaraki; Satoshi Namekawa, Ebina; Eiji Yoshino; Yasumasa Matsuda, both of Hitachi, all of Japan

[73] Assignees: Hitachi, Ltd.; Hitachi Koki Co.; Hitachi Seiko Ltd., all of Tokyo, Japan

[21] Appl. No.: 767,350

[22] Filed: Aug. 21, 1985

[30] Foreign Application Priority Data

Aug. 24, 1984 [JP] Japan ............................... 59-175057

[51] Int. Cl.⁴ ............................................ G01D 18/00
[52] U.S. Cl. ...................................................... 346/75
[58] Field of Search ........................................... 346/75

[56] References Cited

U.S. PATENT DOCUMENTS 3,969,733 7/1976 De Moss et al. .................... 346/1.1
3,999,188 12/1976 Yamada ................................ 346/75

*Primary Examiner*—E. A. Goldberg
*Assistant Examiner*—Gerald E. Preston
*Attorney, Agent, or Firm*—Antonelli, Terry & Wands

[57] ABSTRACT

In an ink jet recording apparatus, an amplification-degree control circuit is associated with an amplifier circuit amplifying a detection signal indicative of the quantity of charge of charged ink droplets, so as to decrease the degree of signal amplification by the amplifier circuit when a charging signal is applied to a charging electrode charging the ink droplets, but to increase the degree of signal amplification by the amplifier circuit when the quantity of charge of the charged ink droplets is detected from the detection signal.

4 Claims, 4 Drawing Figures

INK JET RECORDING APPARATUS

BACKGROUND OF THE INVENTION

This invention relates to an ink jet recording apparatus, and more particularly to improvements in the system detecting the state of ink droplets.

Ink jet recording apparatus of various types including an on-demand type and a charge control type are now available. In the on-demand type ink jet recording apparatus, ink droplets are produced or ejected from a nozzle toward and onto a recording medium when formation of recording dots is demanded. On the other hand, in the charge control type ink jet recording apparatus, ink droplets produced continuously from a nozzle are shielded by a gutter, and, when formation of recording dots is desired, the ink droplets are charged and deflected to be attached to a recording medium. In such ink jet recording apparatus, it is necessary to monitor the state of particulate ink or the state of charged ink for the purpose of improving the quality of records.

More precisely, the ink jet recording apparatus of the on-demand type is such that a pressurized ink container communicating with the nozzle is deformed by an electro-mechanical transducer element driven by a video information signal thereby causing ejection of ink droplets from the nozzle. Therefore, it is necessary to monitor as to whether or not the ink droplets are accurately produced in response to the application of the video information signal to the electro-mechanical transducer element. According to a monitoring method for monitoring accurate production of ink droplets, means for charging ink droplets ejected from the nozzle is provided so as to detect the quantity of charge of the charged ink droplets.

The ink jet recording apparatus of the charge control type is such that an electro-mechanical transducer element mounted on the nozzle ejecting ink is driven by a high-frequency power source to cause oscillation of ink so that the ink ejected from the nozzle is turned into droplets in synchronism with this oscillation. A charging electrode is disposed in the area where ink is turned into droplets, and a video information signal voltage is applied to the charging electrode to charge the ink droplets. An electrostatic field is established in the path of flight of the ink droplets to deflect the charged ink droplets thereby causing attachment of the charged ink droplets to a recording medium. Therefore, in the recording apparatus of this type, it is necessary to monitor as to whether or not the ink droplets are regularly produced and whether or not the charging is properly controlled. According to a monitoring method for monitoring regular production and charge control of the ink droplets, a signal voltage for checking the state of production of ink droplets is applied to the charging electrode with given timing, thereby detecting the quantity of charge of the charged ink droplets.

In such a state detecting system in which the quantity of charge of charged ink droplets is detected for the purpose of monitoring, for example, the state of particulate ink, an induction type sensor disposed in close proximity to the path of flight of ink or an impingement type sensor generating a detection signal indicative of the quantity of charge of charged ink droplets is commonly employed as means for detecting the quantity of charge of charged ink droplets. The detection signal current generated from each of these sensors is very weak or only about several nA. Therefore, in order that the particulate state of ink can be detected on the basis of such a very weak signal current, the detection signal must be amplified, and, for this purpose, an amplifier circuit having a high amplification factor is provided.

On the other hand, the ink jet recording apparatus includes, for example, an electrical circuit for driving the electro-mechanical transducer element, another electrical circuit for charging ink droplets, and a power source circuit for supplying power to these electrical circuits. A detection error may occur when electrical noise generated in any one of these electrical circuits is applied to the sensor and detection signal generating circuit. However, it is almost impossible from the aspect of practical use to prevent mixing of such electrical noise by means such as a shielding member.

U.S. Pat. No. 4,367,476 issued on Jan. 4, 1983 in the name of Syoji Sagae discloses one form of the ink jet recording apparatus of the charge control type in which the quantity of charge of charged ink droplets is detected to monitor the particulate state of ink.

SUMMARY OF THE INVENTION

It is therefore a primary object of the present invention to provide an improved ink jet recording apparatus which comprises an ink-droplet state detecting system which operates substantially free from a detection error attributable to electrical noise.

The present invention which attains the above object is featured by the fact that the ink-droplet state detecting system comprises variable amplification means capable of changing the degree of amplification of the detection signal generated in the system, and an amplification-degree control signal generating circuit applying an amplification-degree control signal to the variable amplification means so as to decrease the degree of signal amplification by the variable amplification means during the period in which the ink-droplet state checking signal is generated, but to increase the degree of signal amplification by the variable amplification means during the time period in which the quantity of charge of the charged ink droplets is to be detected, so that the system may not respond to electrical noise in the time period other than the time period of detection of the quantity of charge of the charged ink droplets.

DESCRIPTION OF THE PREFERRED EMBODIMENTS

An embodiment of the present invention when applied to a micro-dot ink jet recording apparatus of charge control type, so as to detect the state of production of ink droplets of small diameter, will now be described in detail with reference to the drawings.

Figure 1:
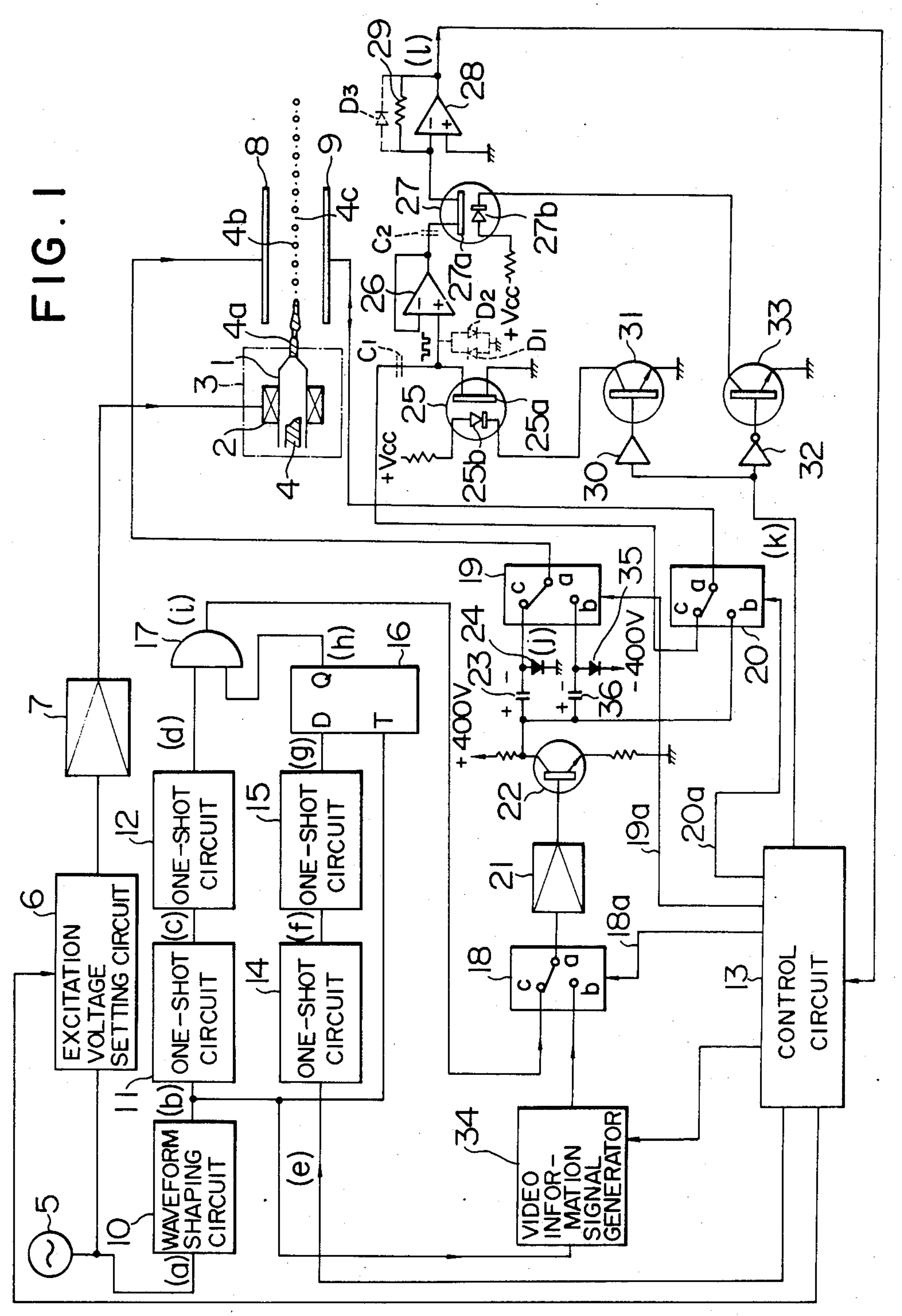
FIG. 1 is an electrical circuit diagram of an embodiment of the present invention as applied to a microdot ink jet recording apparatus of charge control type.

FIG. 1 is an electrical circuit diagram of the micro-dot ink jet recording apparatus of the charge control type. Referring to FIG. 1, ink 4 under pressure is supplied to an ink droplet producing unit 3 including a piezo-electric element 2 mounted on a nozzle 1, and an ink column 4*a* ejected from the nozzle 1 is alternately separated into ink droplets 4*b* of large diameter and ink droplets 4*c* of small diameter. The micro-dot ink jet recording apparatus is so designed that the ink droplets 4*c* of small diameter are charged and deflected to cause attachment of the ink droplets 4*c* of small diameter to a recording medium (not shown) thereby forming recording dots, while the ink droplets of large diameter are blocked by the gutter. Such regular production of the ink droplets 4*b* and 4*c* of large and small diameters is attained when an appropriate excitation voltage is applied to the piezoelectric element 2 from a high-frequency power source 5 through an excitation voltage setting circuit 6 and an amplifier circuit 7, and, in such a case only, charging of the ink droplets 4*c* of small diameter can be controlled. A pair of opposite electrodes 8 and 9 are disposed to extend from an area in the vicinity of the ink droplet producing unit 3 along the path of flight of the ink droplets. These two electrodes 8 and 9 are independently electrically insulated to function as a charging electrode and a detecting electrode respectively.

Figure 2:
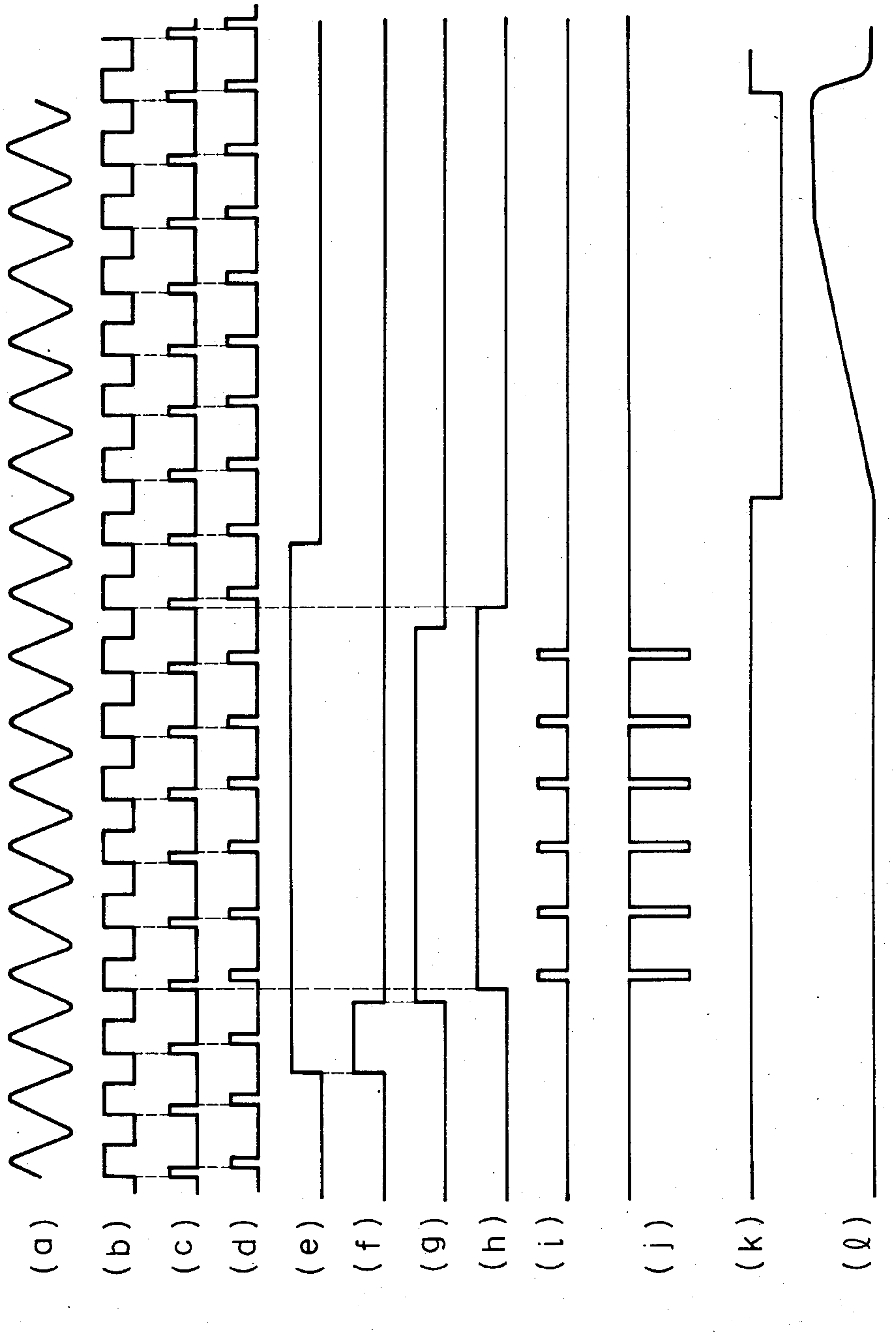
FIG. 2 shows various signal waveforms appearing in FIG. 1.

The system for detecting the state of ink droplets will now be described. The high-frequency power source 5 generates an excitation signal (a) having a waveform as shown in FIG. 2(*a*), and this excitation signal (a) is shaped in a waveform shaping circuit 10 to appear as an output signal (b) having a rectangular waveform as shown in FIG. 2(*b*). A first one-shot circuit 11 acts as a delay circuit for providing predetermined timing with respect to the excitation signal (a) and generates an output signal (c) having a rectangular waveform, as shown in FIG. 2(*c*), which goes high in response to the leading edge of the signal (b) and falls after a time interval determined by the one-shot circuit 11. A second one-shot circuit 12 produces a reference signal (d) having a rectangular waveform, as shown in FIG. 2(*d*), which goes high in response to the trailing end of the signal (c) and continues for a time interval determined by the second one-shot circuit 12. This reference signal (d) is used for checking the state of the ink droplets. In order that the ink droplets 4*c* of small diameter can be charged according to the reference rectangular waveform signal (d), a control circuit 13 including a microcomputer therein generates a checking-signal generation command signal (e) having a waveform as shown in FIG. 2(*e*) at a timing of checking the state of the ink droplets according to a predetermined control sequence stored in the microcomputer. In response to the application of the checking-signal generation command signal (e) from the control circuit 13, a third one-shot circuit 14 generates a delay signal (f) having a rectangular waveform as shown in FIG. 2(*f*) which goes high in response to the leading end of the command signal (e) and falls after a time interval determined by the third one-shot circuit 14. This signal (f) is provided for timing adjustment. A fourth one-shot circuit 15 generates a checking-signal generation signal (g) having a waveform as shown in FIG. 2(*g*), which goes high in response to the trailing end of the rectangular waveform signal (f) and falls after a time interval determined by the fourth one-shot circuit 15. This time interval is selected such that the pulse signals (d) are produced and hence the ink droplets are charged during that time interval sufficiently in number for detecting the state of the ink droplets in a manner as mentioned hereinafter. In this embodiment, six pulse signals (d) are produced and hence six ink droplets are charged during that time interval. The checking-signal generation signal (g) generated from the fourth one-shot circuit 15 is applied to a data terminal D of a flip-flop 16, while the rectangular waveform signal (b) generated from the waveform shaping circuit 10 is applied to a trigger terminal T of the flip-flop 16. The flip-flop 16 produces at its output terminal Q a gate signal (h), as shown in Fig. 2(*h*), which goes high level when the pulse signal (c) goes high level in the presence of the high level signal (g) and goes low level when the pulse signal (c) goes high level in the absence of the signal (g). The gate signal (h) assures, therefore, that the selected number, for example, six of the pulse signals (d) are produced during a time interval corresponding to the wavelength of the gate signal (h). In the presence of both the reference signal (d) and the gate signal (h) an AND gate 17 generates an ink-droplet state checking signal (i) having a waveform as shown in FIG. 2(*i*).

Mode change-over switches 18, 19 and 20 are actuated under command of the control circuit 13. In each of these switches 18, 19 and 20, its movable terminal or contact a is connected to its terminal or contact c in the ink-droplet state detection mode and to its terminal or contact b in the record mode, respectively.

The first mode change-over switch 18 is connected at its contact a to an output transistor 22 through an amplifier 21. The output transistor 22 is connected at its collector to the contact c of the second mode changeover switch 19 through a capacitor 23, so that a charging voltage (j) of negative polarity having a waveform as shown in FIG. 2(*j*) is generated in response to the ink-droplet state checking signal (i) in the ink-droplet state detection mode. A diode 24 acts to suppress generation of a voltage of positive polarity.

The charging voltage (j) is applied to the electrode 8 to positively charge the ink droplets 4*c* of small diameter. Charges of negative polarity corresponding to the quantity of positive charge of the charged ink droplets 4*c* are induced in the electrode 9. When the charging voltage (j) disappears, the ink droplets 4*c* of small diameter present in the zone opposite to the electrode 9 are not charged and advanced towards the gutter successively, so that the number of the charged ink droplets 4*c* of small diameter present in the zone opposite to the electrode 9 decreases successively. As a result, the charges of negative polarity induced in the electrode 9 are also successively discharged, so that a detection signal current flows through an FET 25*a* of an FET photocoupler 25 connected to the electrode 9 through the third mode change-over switch 20. This detection signal current has a high level when the ink droplets 4*c* of small diameter are properly produced and charged in a relation matching the timing of generation of the charging voltage (j). On the other hand, this detection signal current has a low level or disappears when the ink droplets 4*c* of small diameter are not properly produced and are not then charged in a relation matching the timing of generation of the charging voltage (j).

The impedance of the FET 25*a* in the FET photocoupler 25 is large or about several-ten MΩ when an associated light-emitting diode 25*b* is in its deenergized state, but is small or only about 100Ω when the light-emitting diode 25*b* is in its energized state. The detection signal current described above is converted into a corresponding voltage by the FET 25*a*, and this voltage is applied through an impedance matching circuit provided by an operational amplifier 26 to an amplifier circuit constituted by an FET 27*a* of an FET photocoupler 27 similar to the FET photocoupler 25, an operational amplifier 28 and a feedback resistor 29. The voltage amplified by the amplifier circuit provides a detection signal voltage (l) as shown in FIG. 2(*l*).

The control circuit 13 generates a control signal (k) as shown in FIG. 2(*k*) so as to control the energization and deenergization of the respective light-emitting diodes 25*b* and 27*b* in the two FET photocouplers 25 and 27. The control signal (k) is applied through a buffer 30 to a transistor 31 to turn on the transistor 31 when the control signal (k) is in its high level, thereby energizing the light-emitting diode 25*b*. On the other hand, when the control signal (k) turns into its low level, the transistor 31 is turned off to deenergize the light-emitting diode 25*b*. The control signal (k) is applied also to another transistor 33 through an inverter 32 to turn on the transistor 33 when the control signal (k) is in its low level, thereby energizing the light-emitting diode 27*b*. On the other hand, when the control signal (k) turns into its high level, the transistor 33 is turned off to deenergize the light-emitting diode 27*b*. The buffer 30 is provided for matching the timing in operation of the transistors 31 and 33.

The control signal (k) turns into its low level during only the period in which amplification of the detection signal is required, while it is maintained in its high level in the other periods. When the control signal (k) is in its low level, the light-emitting diode 25*b* is deenergized, while the light-emitting diode 27*b* is energized. As a result, the impedance of the FET 25*a* is high, while that of the FET 27*a* is low, and the detection signal current is converted into a voltage which is amplified by a high degree amplification to provide the desired detection signal voltage (l). On the other hand, when the control signal (k) is in its high level, the light-emitting diode 25*b* is energized, while the light-emitting diode 27*b* is deenergized. As a result, the impedance of the FET 25*a* is low, while that of the FET 27*a* is high, and the detection signal current is converted into a voltage which is amplified by a low degree of amplification. Thus, occurrence of a detection error is prevented even when noise mixes into the signal during the above period.

In response to the application of the detection signal voltage (l), the control circuit 13 judges as to whether or not the ink droplets 4*c* of small diameter are accurately produced, on the basis of the level of the signal voltage (l). When the result of judgment proves that the ink droplets 4*c* of small diameter are not accurately produced, the control circuit 13 applies an excitation-voltage changing command signal to the excitation voltage setting circuit 6 to change the excitation voltage and generates the checking-signal generation command signal (e) for checking the state of the ink droplets 4*c* of small diameter again, so that the control for detecting the quantity of charge of the charged ink droplets 4*c* of small diameter is repeated.

Figure 3:
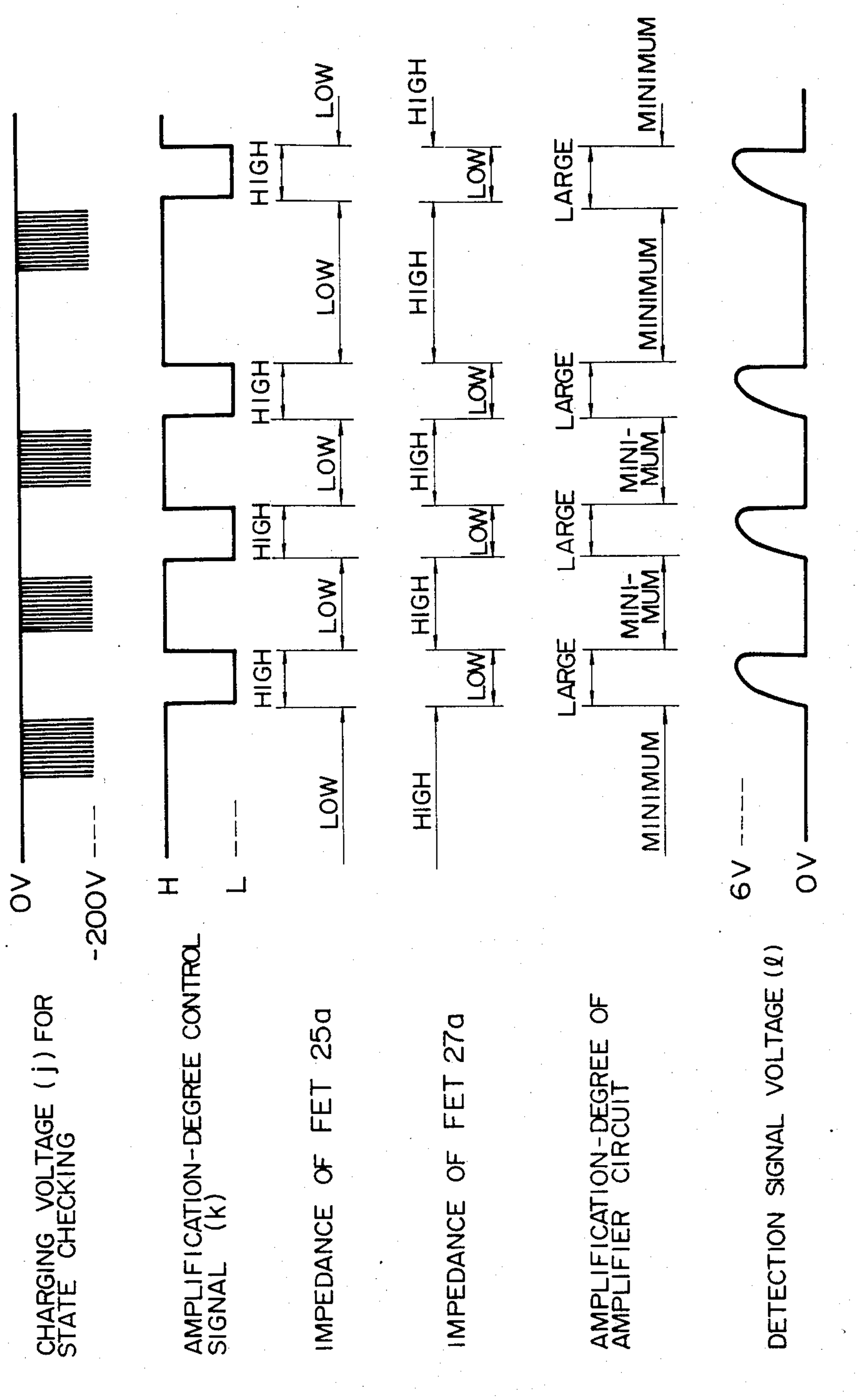
FIG. 3 is a time chart of the state detecting operation.

FIG. 3 is a timing chart of operation of the state detecting system detecting the state of the ink droplets 4*c* of small diameter in a manner as described above.

When the optimum state of production of the ink droplets 4*c* of small diameter is detected, the excitation voltage setting of the excitation voltage setting circuit 6 is fixed at the corresponding value under control of the control circuit 13, and the record mode takes place.

The recording system will now be described. The rectangular waveform signal (b) generated from the waveform shaping circuit 10 is applied also to a video information signal generating circuit 34. According to the phase of generation of the rectangular waveform signal (b) applied thereto, the video information signal generating circuit 34 generates a video information signal in a relation coincident with the production timing of the ink droplets 4*c* of small diameter. That is, the ink droplets 4*c* are produced in synchronism with the signals (d), while the video information signals are produced in synchronism with the signals (b) and the generation in timing of the signal (d) is selected such that the center in wavelength of the video information signal substantially coincides with the center of the signal (d). In the record mode, the control circuit 13 generates mode changeover command signals 18*a*, 19*a* and 20*a* to connect the contacts a to the contacts b in the mode change-over switches 18, 19 and 20, respectively. As a result, the electrode 8 is connected through a diode 35 to a power source of −400 V, while the electrode 9 is connected to a power source of +400 V. The ink column 4*a* ejected from the nozzle 1 is placed in the middle of the electric field established by the two electrodes 8 and 9. Under such a situation, therefore, the ink droplets are charged with equal quantities of positive and negative charges and become electrically neutral. The video information signal is amplified by the amplifier 21 to trigger the output transistor 22. The output transistor 22 is connected at its collector to the contact b of the mode change-over switch 19 through a capacitor 36. Therefore, when the output transistor 22 is turned on, the potential of the electrode 8 is biased negative relative to that of the electrode 9 by the amount corresponding to the voltage charging the capacitor 36. The ink droplets 4*c* of small diameter are charged by this biased voltage. The ink droplets 4*c* of small diameter thus charged are deflected while flying through the electric field established by the electrodes 8 and 9 and attach to the recording medium to form recording dots thereon.

Figure 4:
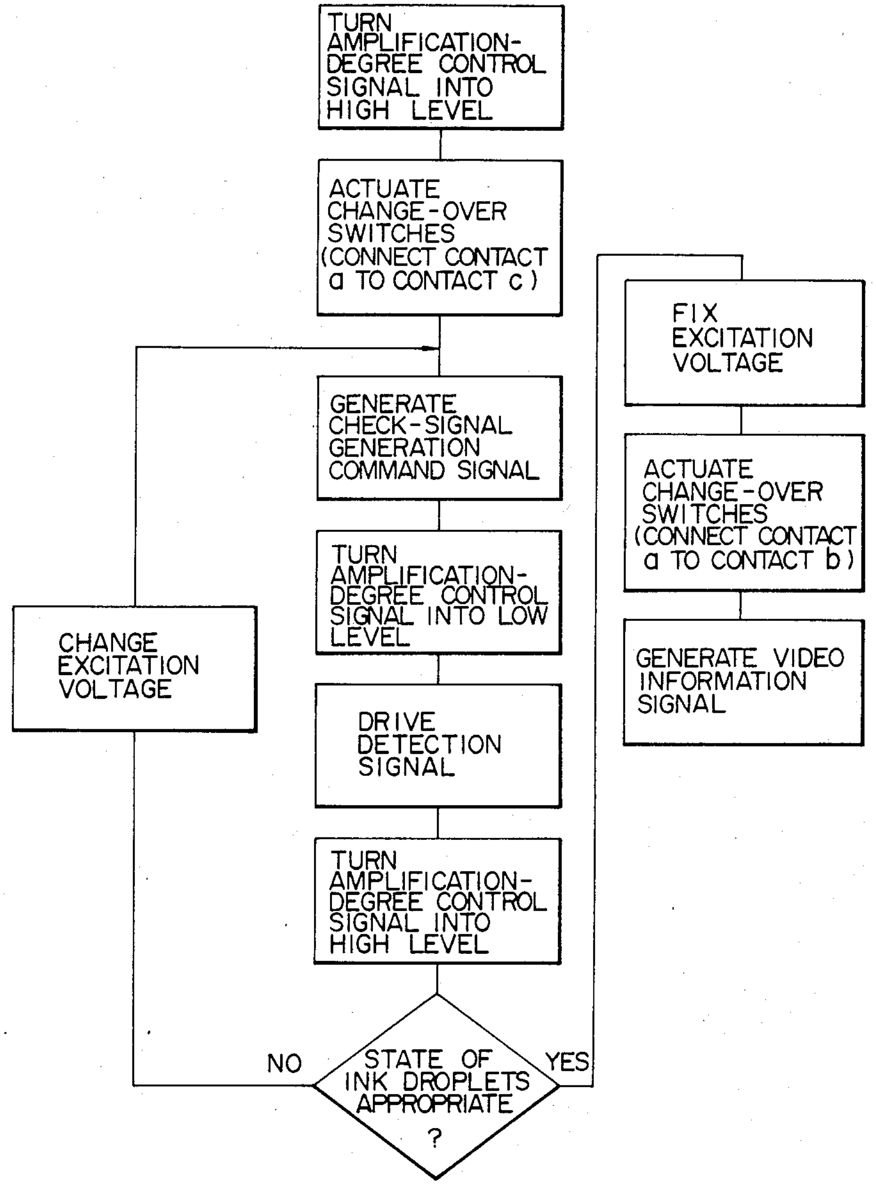
FIG. 4 is a flow chart showing the operation of the control circuit shown in FIG. 1.

FIG. 4 is a flow chart showing the operation of the control circuit 13 carrying out the above manner of control.

In the embodiment described above, the current flowing from ground to the electrode 9 through the FET 25*a* in FIG. 1 changes with time. Therefore, when a capacitor $C_1$ as shown by the broken lines in FIG. 1 is inserted between the FET 25*a* and the electrode 9 to cut off the DC component, DC leakage current can be removed so that the detection signal current can be more stabilized. Further, when a pair of diodes $D_1$ and $D_2$ are connected in anti-parallel relation across the terminals of the FET 25*a* as shown by the broken lines in FIG. 1 so as to clamp an overvoltage, the operational amplifiers 26 and 28 can be protected against damage. Also, when a capacitor $C_2$ is inserted between the operational amplifier 26 and the FET 27*a* as shown by the broken lines in FIG. 1, an adverse effect of an offset voltage that may appear at the operational amplifier 26 can be obviated. The detection signal current is a unidirectional current. Therefore, when a diode D3 is connected in parallel with the feedback resistor 29 associated with the operational amplifier 28, as shown by the broken lines in FIG. 1, so that a voltage induced due to reverse flow of a noise current may not be amplified, the anti-noise characteristic of the system can be further improved. Further, the FET photocouplers 25 and 27 may be replaced by any other circuit elements having similar characteristics.

In the aforementioned embodiment, the level of the excitation voltage is changed to change the state of production of ink droplets, by way of example. For the purpose of closer adjustment of the operation, the time constant of the one-shot circuit 11 may be changed to change the timing of generation of the ink-droplet state checking signal, and the corresponding change in the quantity of charge of charged ink droplets may also be detected to attain comprehensive detection of the state of production of the ink droplets.

The charge-quantity detecting means described above is not only applicable to the micro-dot ink jet recording apparatus of the charge control type taken as an example herein. The charge-quantity detecting means is also applicable to recording apparatus such as an ordinary ink jet recording apparatus of the charge control type producing ink droplets of large diameter only and to an ink jet recording apparatus of the on-demand type. In the case of the latter application, the quantity of charge of charged ink droplets is detected to detect the state of production of ink droplets such as the presence or absence of ink droplets, the size of ink droplets and the timing of production of ink droplets or the charging efficiency is regulated by charging ink droplets by a test signal voltage.

We claim:

1. An ink jet recording apparatus comprising a recording system recording an image by the combination of recording dots formed by attachment of ink droplets to a recording medium according to a video information signal and a state detecting system including means for producing charged ink droplets charged according to an ink-droplet state checking signal, a detecting electrode generating a detection signal indicative of the quantity of charge of the charged ink droplets, and means for amplifying the detection signal for detecting the state of the ink droplets on the basis of the level of the amplified detection signal, wherein said ink-droplet state detecting system comprises variable amplification means capable of changing the degree of amplification of the detection signal in said system, and an amplification-degree control signal generating circuit applying an amplification-degree control signal to said variable amplification means so as to decrease the degree of signal amplification by said variable amplification means during the period in which said ink-droplet state checking signal is generated, but to increase the degree of signal amplification by said variable amplification means during the period in which the quantity of charge of the charged ink droplets is to be detected.

2. An ink jet recording apparatus as claimed in claim 1, wherein said variable amplification means includes an FET photocoupler converting the detected signal current from said detecting electrode into a voltage, and an amplifier amplifying the voltage generated from said FET photocoupler, and said amplification-degree control signal generating circuit generates a control signal for controlling the internal impedance of said FET photocoupler.

3. An ink jet recording apparatus comprising a recording system recording an image by the combination of recording dots formed by attachment of ink droplets to a recording medium according to a video information signal and a state detecting system including means for generating, for a predetermined period of time, a state checking signal charging the ink droplets, a detecting electrode generating a detection signal indicative of the quantity of charge of the charged ink droplets, and means for amplifying the detection signal for detecting the state of the ink droplets on the basis of the level of the amplified detection signal, wherein said ink-droplet state detecting system comprises variable amplification means capable of changing the degree of signal amplification of the detection signal in said system, and an amplification-degree control signal generating circuit applying an amplification-degree control signal to said variable amplification means so as to decrease the degree of signal amplification by said variable amplification means during the period in which said state checking signal is generated, but to increase the degree of signal amplification by said variable amplification means after said state checking signal disappears.

4. An ink jet recording apparatus as claimed in claim 3, wherein said state checking signal is generated from said state checking signal generating means in a period alternated by a period of no signal generation, and said amplification-degree control signal generating circuit applies said amplification-degree control signal to said variable amplification means so as to decrease the degree of signal amplification by said variable amplification means during the period in which said state checking signal is generated, but to increase the degree of signal amplification by said variable amplification means during the period in which said state checking signal is not generated.

* * * * *